United States Patent
Goller et al.

(10) Patent No.: US 11,554,494 B2
(45) Date of Patent: Jan. 17, 2023

(54) DEVICE FOR ACQUIRING A POSITION AND ORIENTATION OF AN END EFFECTOR OF A ROBOT

(71) Applicant: Carl Zeiss Industrielle Messtechnik GmbH, Oberkochen (DE)

(72) Inventors: Heiko Goller, Obersulm (DE); Peter Hofmann, Niedernhall (DE); Ivan Kausz, Oehringen (DE); Gernot Sattelmayer, Oehringen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 529 days.

(21) Appl. No.: 16/594,014

(22) Filed: Oct. 5, 2019

(65) Prior Publication Data
US 2020/0108506 A1    Apr. 9, 2020

(30) Foreign Application Priority Data

Oct. 5, 2018  (DE) .................... 10 2018 124 595.5

(51) Int. Cl.
*B25J 9/16*    (2006.01)
(52) U.S. Cl.
CPC .......... *B25J 9/1697* (2013.01); *B25J 9/1653* (2013.01); *B25J 9/1664* (2013.01)
(58) Field of Classification Search
CPC ...... B25J 9/1697; B25J 9/1653; B25J 9/1664; B25J 9/1602; B25J 9/163; B25J 9/1692; G05B 2219/39192; G05B 2219/40595
See application file for complete search history.

(56) References Cited

U.S. PATENT DOCUMENTS 9,956,686 B2    5/2018  Kokubo
10,118,714 B2   11/2018 Reid et al.
(Continued)

FOREIGN PATENT DOCUMENTS

CN    105035348 A    11/2015
CN    107430772 A    12/2017
(Continued)

OTHER PUBLICATIONS

Office Action issued in German Patent Application No. DE 10 2018 124 595.5, dated Mar. 21, 2019 (from which this application claims priority) and English language translation thereof.
Office Action issued in Chinese Counterpart Patent Application No. 201910939767.3, dated Jul. 20, 2022 and English language translation thereof.

*Primary Examiner* — Nicholas Kiswanto
*Assistant Examiner* — Dylan Brandon Mooney
(74) *Attorney, Agent, or Firm* — Ewers IP Law PLLC; Falk Ewers (57) ABSTRACT

A device for acquiring a position and orientation of an end effector of a robot is provided. The robot has a robot arm with axes coupled to one another by joints. The end effector is arranged on an end of the robot arm, optical markers are arranged on first and second axes, and a number of joints between the end effector and the first axis is lower than a number of joints between the end effector and the second axis. An optical sensor acquires image data of the optical markers. A storage device stores a kinematic model of the robot arm. An evaluation device, in a first case, determines a first position of a first optical marker and the position and orientation of the end effector and, in a second case, a second position of a second optical marker and the position and orientation of the end effector.

17 Claims, 5 Drawing Sheets

(56) References Cited

U.S. PATENT DOCUMENTS

| | | |
|---|---|---|
| 10,613,517 B2 | 4/2020 | Allardice et al. |
| 10,648,792 B2 | 5/2020 | Held |
| 10,706,562 B2 | 7/2020 | Haverkamp et al. |
| 10,814,484 B2 | 10/2020 | Preisinger et al. |
| 2003/0215130 A1* | 11/2003 | Nakamura ................ G06T 7/20 382/154 |
| 2009/0088897 A1* | 4/2009 | Zhao ...................... A61B 34/30 700/250 |
| 2011/0295421 A1* | 12/2011 | Ban ......................... B25J 9/101 901/46 |
| 2017/0072562 A1* | 3/2017 | Kokubo ................ B25J 9/1638 |
| 2018/0354130 A1* | 12/2018 | Preisinger ............. B25J 9/1656 |
| 2019/0039246 A1* | 2/2019 | Kokubo ................ B25J 9/1692 |
| 2020/0016758 A1* | 1/2020 | Keller ................... B25J 9/1692 |

FOREIGN PATENT DOCUMENTS

| | | |
|---|---|---|
| CN | 107883831 A | 4/2018 |
| CN | 108369406 A | 8/2018 |
| DE | 102009042702 A1 | 3/2011 |
| DE | 102014209371 A1 | 11/2014 |
| DE | 102014215321 A1 | 2/2016 |
| DE | 102016116811 A1 | 3/2017 |
| DE | 102016225613 A1 | 6/2018 |
| FR | 3054468 A1 | 2/2018 |
| JP | 2003117861 A | 4/2003 |

\* cited by examiner

DEVICE FOR ACQUIRING A POSITION AND ORIENTATION OF AN END EFFECTOR OF A ROBOT

CROSS REFERENCE TO RELATED APPLICATIONS

This application claims priority to German patent application DE 10 2018 124 595.5, filed Oct. 5, 2018, the entire content of which is incorporated herein by reference.

TECHNICAL FIELD

This disclosure relates to a device for acquiring a position and orientation (i.e., a pose) of an end effector of a robot, for example during a working process, executed by the robot, in an industrial environment. The disclosure further relates to a position acquisition system and to a method for acquiring a position and orientation (i.e., a pose) of an end effector of a robot.

BACKGROUND

Robots, for example industrial robots, are universally usable programmable machines that are used for example in the measurement, installation, machining, handling and/or quality control of workpieces in the industrial environment.

The robots generally have a robot arm (what is known as a manipulator), a control device and an end effector. A tool, a gripper and/or one or more sensors for example may be arranged on the end effector, these being used for example to measure, machine, install, handle and/or control the quality of workpieces. Due to the fact that a plurality of working processes are executed autonomously by robots, the degree of automation and also efficiency are increasing, which leads to ever-increasing quantities being able to be produced with a small time expenditure and low rejection quotas.

In order to guarantee that robot-controlled working processes are performed precisely, it is necessary to track as accurately as possible or to control positionally accurately the often complex motion sequences of the robots. In this case, the robots often have a plurality of axes with a plurality of joints, by way of which a plurality of different motion sequences with the highest possible number of degrees of freedom is guaranteed.

Especially in the case of machining robots, which are used for example to place weld spots on bodywork parts, it is necessary to be able to determine as far as possible the position and orientation of the end effector, on which for example a welding gun is arranged, at all times of this working process.

Also when using robots in what is known as inline measurement technology in which measured data are acquired in a clocked manner, for example by way of optical measurement sensors, within a production line and may serve as a process control variable in the production line, it is necessary to determine the position and orientation of the end effector as accurately as possible. An optical measurement sensor may for example be arranged on the end effector, which optical measurement sensor measures the workpiece/bodywork part in order to establish production errors and/or to check compliance with the required measurement tolerances. In such a case, it is absolutely necessary to determine the position and orientation of the end effector in order to be able to guarantee an exact determination of the measured data. Especially in highly automated production lines, it is possible to tolerate only very slight deviations, since the individual errors are superimposed in the subsequent working steps.

A first approach for determining the position and orientation of the end effector of a robot as accurately as possible is that of constantly (re)calibrating a robot control model during a working process. In this case, the control model of the robot, by way of which all of the motion sequences of the robot are controlled, is constantly recalibrated during a working process by measurements on objects in space (what are known as artefacts) whose respective position in space is known. Such (re)calibration is necessary for example in order to at least partly compensate temperature-induced material expansion of individual parts of the robot. Such material expansions are caused for example by heating of individual parts of the robot during the working process.

One problem of the first approach is that constantly calibrating the robot model using the artefacts is not enough to guarantee sufficient accuracy when determining the position and orientation of the end effector (that is to say when measuring workpieces).

To increase accuracy, it is possible for example to correlate the measured values acquired by the robot (that is to say the inline measurement system) with measured values of an (external) coordinate measurement device and thus correct the absolute values of the position and orientation of the end effector of the robot. However, these correlations are highly complex and are generally accompanied by a high cost outlay.

One variant of the first approach may also be that of determining all possible positions of the end effector at all planned measurement points once using an external system when a robot is put into service. However, the flexibility of the system, for example when reorienting the end effector, installing a new sensor and/or when travelling to new measurement positions, is restricted.

A second approach for determining the position and orientation of the end effector of a robot as accurately as possible is that of tracking the robot-controlled sensor or end effector using a generally external position acquisition system.

However, the second approach requires the end effector to be tracked of the robot to always be located in a field of view of the external position acquisition system. This can however not be guaranteed in a large number of production processes. For example, some parts of the robot may be concealed by other parts of the robot (what is known as self-concealment), or parts of the robot, for example the end effector, may be concealed by the workpiece to be machined when a production step is performed. In automotive production, robots "dip" into the wheel housings and/or the engine space of bodywork to be machined, for example during checking or when placing weld spots. The end effector and possibly also further parts of the robot arm are not visible to a position acquisition system in such positions (visibility problem).

Therefore, the known approaches for determining a position and orientation of an end effector of a robot are either highly complex and connected with a high cost outlay or not able to be applied to determine the position and orientation of the end effector in every working position.

SUMMARY

It is an object to provide a device for acquiring a position and orientation of the end effector of a robot, by way of which the use of complex and cost-intensive correlation systems can be dispensed with and at the same time position and orientation determination of the end effector is guaranteed in every working position, with the flexibility of the robot remaining high.

According to a first aspect, a device for acquiring a position and orientation of an end effector of a robot is provided, wherein the robot has a robot arm having a plurality of axes that are coupled to one another by a plurality of joints, wherein the end effector is arranged on a first end of the robot arm, wherein a first optical marker is arranged on a first axis of the plurality of axes, wherein a second optical marker is arranged on a second axis of the plurality of axes, and wherein a lower number of joints is arranged between the end effector and the first axis than between the end effector and the second axis, and wherein the device includes the following components: (i) an optical sensor which is configured to acquire image data of the first and/or second optical marker; (ii) a storage device which stores a kinematic model of the robot arm; and (iii) an evaluation device which is configured, in a first case in which the first optical marker is visible to the optical sensor, to determine a first position of the first optical marker based on the image data and to determine the position and orientation of the end effector based on the first position and, in a second case in which the first optical marker is not visible to the optical sensor but the second optical marker is visible to the optical sensor, to determine a second position of the second optical marker based on the image data and to determine the position and orientation of the end effector based on the second position and based on the kinematic model.

According to a second aspect, a position acquisition system is presented which includes: (i) a robot having an end effector and a robot arm including a plurality of axes that are coupled to one another by a plurality of joints, wherein the end effector is arranged on a first end of the robot arm, wherein a first optical marker is arranged on a first axis of the plurality of axes, wherein a second optical marker is arranged on a second axis of the plurality of axes, and wherein a lower number of joints is arranged between the end effector and the first axis than between the end effector and the second axis; and (ii) a device for acquiring a position and orientation of the end effector of the robot. The device includes an optical sensor which is configured to acquire image data of the first and/or second optical marker, a storage device which stores a kinematic model of the robot arm, and an evaluation device which is configured, in a first case in which the first optical marker is visible to the optical sensor, to determine a first position of the first optical marker based on the image data and to determine the position and orientation of the end effector based on the first position and, in a second case in which the first optical marker is not visible to the optical sensor but the second optical marker is visible to the optical sensor, to determine a second position of the second optical marker based on the image data and to determine the position and orientation of the end effector based on the second position and based on the kinematic model.

According to a third aspect, a method for acquiring a position and orientation of an end effector of a robot is provided. The method includes the following steps: (i) acquiring image data of the first and/or second optical marker; (ii) providing a kinematic model of the robot arm, and (iii) determining the position and orientation of the end effector, wherein, in a first case in which the first optical marker can be acquired, a first position of the first optical marker is determined based on the image data and the position and orientation of the end effector are determined based on the first position and, in a second case in which the first optical marker cannot be acquired but the second optical marker can be acquired, a second position of the second optical marker is determined based on the image data and the position and orientation of the end effector are determined based on the second position and based on the kinematic model.

One advantage of the device and method provided herein is that the accuracy of a purely model-based approach can be significantly increased by incorporating the image data. In addition, by linking the external position acquisition with the kinematic model, it is possible to completely solve the visibility problem of the second approach.

As well as determining the position of the visible axis closest to the end effector in connection with the simulative determination of the (relative) position and (relative) orientation of the end effector starting from this position based on the kinematic model, the position and orientation of the end effector can be determined unambiguously in every working position of the robot arm. The second approach mentioned at the outset would not deliver any results in the second case, since the end effector or the first axis is not visible to the optical sensor.

According to an aspect of the disclosure, the visibility problem described above has been reduced to the lowest possible number of non-visible axes. In other words, a position and orientation of an axis are typically determined by way of an optical evaluation of acquired image data (based on the optical markers). The position and orientation are determined based on the kinematic model only when axes are not visible, as a result of which the overall accuracy of the device can be increased in comparison with the first and/or second approach mentioned at the outset.

By virtue of the device according to an aspect of the disclosure, axes for example having a large lever arm, in comparison with a purely model-based approach, no longer contribute to errors when determining the position and orientation of the end effector. This is achieved in that the axis of the robot arm (or the optical marker arranged thereon) is typically determined based on the evaluation of image data by the evaluation device between which the lowest number of joints with respect to the end effector in comparison with the other axes of the robot arm is arranged. The visibility problem is thus reduced just to the axes that lie outside of the field of view of the optical sensor.

In the second case, the position and orientation of the end effector are determined in that the second position of the second optical marker is determined by the evaluation device, and the position and orientation of the end effector is determined, starting from the second position, based on the kinematic model. That is to say in other words that the evaluation device determines the position and orientation of the robot by evaluating the image data of the second optical marker as far as the second position, as a result of which the visibility problem is reduced just to the first axis. By applying the kinematic model, it is possible to determine the position and orientation of the end effector starting from the second position. Errors generated by the kinematic model, that is to say the deviation between a position of the end effector as determined by the kinematic model and its real position, are thus reduced to just one axis.

This has a particular advantage in comparison with the purely model-based approach mentioned above for determining the position and orientation of the end effector. In the model-based approach, only the measured data of axis angles between the plurality of axes are available for the position determination. No information about a possible incorrect position of individual axes is available, for example. Such incorrect positions may for example lead to a situation whereby errors in individual axes are superimposed. If such errors are for example already present on axes that are arranged on an end, opposite the end effector, of the robot arm, this error is transferred (and possibly superimposed on other errors) along a kinematic path defined by the robot arm as far as the end effector, as a result of which large deviations in comparison with the real position arise in the position and orientation determination.

By virtue of the device according to an aspect of the disclosure, it is possible to determine incorrect positions of individual visible axes by evaluating image data. The position determination for all visible axes is thus subject to just a very small deviation.

Independently of whether the above-described first or the above-described second case is present, the mentioned principle of the present disclosure does not rule out the evaluation device determining more than just the position of an optical marker based on the image data in order to determine the position and orientation of the end effector.

According to a exemplary embodiment, it is typical for the optical sensor to acquire image data of as many visible optical markers as possible, for the evaluation device to determine the position of more than just one optical marker based on the image data, and for the evaluation device to determine the position and orientation of the end effector based on these positions and possibly the kinematic model. In the first case (first marker visible), the evaluation device could thus determine for example the position of the first, second, third, and fourth marker and determine the position and orientation of the end effector based on this position. In the second case (first marker not visible), the evaluation device could determine for example the position of the second, third, and fourth marker and determine the position and orientation of the end effector based on this position.

Determining the position of a plurality of markers based on the image data and subsequently determining the position and orientation of the end effector based on a plurality of marker positions has, inter alia, the following advantages: Firstly, the stability and accuracy of the evaluation is thereby increased. Mismatches or contradictions in their position determinations can thereby be detected. Secondly, this approach makes it easier to determine the spatial position of the end effector, since this can be determined more easily based on two or more marker positions than based on just one marker position.

The term "plurality" is understood in the present case to mean a number of two or more.

The optical markers may be arranged as additional parts on the axes, for example in the form of markings of a particular shape, size and/or geometry. The optical markers are in this case typically configured to deliver image information that can be acquired unambiguously for the optical sensor when the image data are recorded. This image information that can be acquired unambiguously may be unambiguously delimited from a peripheral environment by the evaluation device and thus determined. The optical markers may also be screws, rivet points, recesses, bulges and/or the like. The screws, rivet points, recesses, bulges and/or the like may be arranged for example on the axes or on a surface of the robot arm and function as optical markers.

The kinematic model may for example be a predefined algorithm that generates the motion sequences of the robot arm as a simulation, for example. The kinematic model may have one or more input variables that include real-time information about the motion sequence. However, motion sequences of the robot may also be reproduced in a purely simulative manner, without incorporating external input variables. The kinematic model may be stored for example in the storage device in the form of a program that can be executed by the evaluation device. A virtual memory, for example in the form of an Internet-based cloud and in which the kinematic model is stored, for example in the form of an executable script, is likewise conceivable.

The positions of the optical markers that are determined based on the image data and/or based on the kinematic model are numbered consecutively in the present case. This numbering however serves merely to simplify the nomenclature and to make it easier to distinguish the individual positions from one another.

According to a exemplary embodiment, the evaluation device is configured, in the second case, to determine a relative position and a relative orientation of the end effector in relation to the second position based on the kinematic model.

The kinematic model may for example receive the second position (that is to say the position of the second optical marker as determined based on the image data) as input variable, and determine the position and orientation of the end effector in relation to the second position starting from the second position. Temperature-induced errors when determining the position using the kinematic model can thus be reduced to just the first axis. A potential error in the kinematic model is thus reduced to just one axis along the kinematic path, as a result of which it is possible to increase the overall accuracy when acquiring the position and orientation of the end effector in comparison with the purely model-based approach.

According to a further exemplary embodiment, the optical sensor is configured to acquire image data of a third optical marker that is arranged on a third axis of the plurality of axes, wherein a lower number of joints is arranged between the end effector and the second axis than between the end effector and the third axis, and wherein the evaluation device is configured, in a third case in which both the first and the second optical marker are not visible to the optical sensor but the third optical marker is visible to the optical sensor, to determine a third position of the third optical marker based on the image data and to determine the position and orientation of the end effector based on the third position and based on the kinematic model.

This exemplary embodiment has the advantage that, when the first and second axis are concealed, for example by a bodywork part when the robot arm dips into a wheel housing, the position and orientation of the end effector can be determined as far as the third position of the third optical marker based on the image data. The position and orientation of the end effector are determined in that the evaluation device is configured, in the third case, to determine a relative position and a relative orientation of the end effector in relation to the third position based on the kinematic model. The accuracy in comparison with the purely model-based approach, in which the position and orientation of the end effector are determined without incorporating position data of the third optical marker, can thus be increased. The abovementioned second approach would not deliver any results in any case in the third case, since the first and second axis are not visible to the optical sensor.

In a further exemplary embodiment, the evaluation device is configured, in the first case, to determine the first position of the first optical marker based on the image data and to determine a fourth position of the first optical marker based on the kinematic model, and to calibrate the kinematic model based on a comparison of the first position with the fourth position.

Combining the optical evaluation with the evaluation based on the kinematic model results in the advantage that for example temperature influences and position and/or orientation changes caused thereby can be determined unambiguously in the form of real data (of the first position) by evaluating the acquired image data. These real data may be used when calibrating the kinematic model in order to calibrate the fourth position, determined purely computationally, through comparison with the first position. The position of the first optical marker (the fourth position) as calculated based on the kinematic model may for example deviate from the real position (of the first position) for example due to temperature influences that are not taken into consideration. The exemplary embodiment additionally has the advantage that, for example when calibrating with respect to additional artefacts, information about the actual positions of the individual axes of the robot is already present. The accuracy of the position determination can be increased.

According to a further exemplary embodiment, the evaluation device is configured, in the second case, to determine the second position of the second optical marker based on the image data and to determine a fifth position of the second optical marker based on the kinematic model, and to calibrate the kinematic model based on a comparison of the second position with the fifth position.

This exemplary embodiment has the advantage that it is possible to calibrate the kinematic model as far as a still visible axis even when there are one (or more) non-visible axes. Temperature influences can thus be corrected by comparing the difference between the position of the second optical marker, which is determined based on the kinematic model (fifth position), based on the position of the second optical marker, which is determined based on the image data (second position). The influence of temperature-induced deviations can be reduced to the non-visible axes between the still visible axis and the end effector.

In a further exemplary embodiment, the optical sensor includes a plurality of cameras.

The plurality of cameras is arranged at different positions in a space surrounding the robot and thus views the workspace of the robot from different viewing angles. As a result, even in the case of complex working processes containing complex motion sequences, as many of the axes/optical markers as possible can be acquired by at least one of the plurality of cameras. The plurality of cameras is calibrated both intrinsically and extrinsically with respect to one another. The intrinsic and extrinsic calibration unambiguously determines the position and orientation of the individual cameras both individually (intrinsically) and with respect to one another (extrinsically).

In a further exemplary embodiment, the evaluation device is furthermore configured to receive control commands from a control device in order to control the robot arm and, in the second case, to determine the position and orientation of the end effector based on the second position, based on the kinematic model and based on the control commands.

The control device is configured to control the individual axes of the robot arm in each case individually, for example by driving the plurality of joints. The individual joints of the plurality of joints may include rotation sensors, for example rotary encoders or encoders, which each generate a sensor signal depending on an angle of rotation. The respective sensor signal of the rotation sensors is transmitted to the control device.

The control device compares a predefined setpoint position of the respective joint with an actual position, transmitted by the respective sensor signal, of the respective joint. The comparison takes place in the form of the control commands that are transmitted to the respective joint of the plurality of joints. Current information about the position and orientation of the plurality of axes of the robot arm is accordingly already acquired in the control commands. This may advantageously be jointly incorporated into the kinematic model when evaluating the position and orientation, for example as additional input variables. The accuracy of the position and orientation determination of the end effector can thereby be increased even further.

In addition to the position acquisition device, this disclosure also relates to the entire position acquisition system that includes the herein presented device and robot. The above-mentioned exemplary embodiments therefore relate not only to the position acquisition device itself, but also equally and equivalently to the entire position acquisition system.

In one exemplary embodiment of the position acquisition system, the robot arm includes six axes.

Robot arms that have six axes are used for example in automotive production, since the six axes or the accompanying six degrees of freedom of the robot arm allow highly complex motion sequences. As a result, it is possible for example to measure, machine and/or check workpieces having a complex geometry, for example bodywork parts (components).

According to a further exemplary embodiment, there is no joint arranged between the end effector and the first axis.

In this exemplary embodiment, the end effector is already the last movable element of the robot arm, on which for example a machining tool and/or one or a plurality of sensors is arranged.

In a further exemplary embodiment, at least one joint is arranged between the end effector and the second axis.

In this exemplary embodiment, the robot arm includes at least one further joint, that is to say one further degree of freedom, along a kinematic path under consideration that starts from the second axis and runs along the robot arm in the direction of the end effector. If the robot arm is compared for example with a human arm on which the end effector forms the "wrist", then at least one further joint, that is to say one further axis, is arranged for example following the second axis. The second axis makes it possible for example to execute a vertical rotation. The further axis may allow for example a horizontal rotational movement of the "wrist".

In a further exemplary embodiment, the first optical marker is arranged on the end effector.

This has the advantage that, when the end effector is visible (for example in the first case), its position and orientation can already be determined unambiguously based on the image data, without having to jointly incorporate the kinematic model.

In a further exemplary embodiment, a tactile and/or an optical measurement sensor is arranged on the end effector.

This exemplary embodiment is advantageous in particular when the robot is a measurement robot for the tactile and/or optical measurement of a workpiece. The tactile and/or optical measurement sensor in this case samples the workpiece to be measured. The tactile and/or optical measurement sensor may however also be used to continuously recalibrate the robot during a measurement process based on artefacts. Such an exemplary embodiment is additionally advantageous since for example, during a working process, the tactile and/or the optical measurement sensor may be used to check a required minimum distance between the end effector and a workpiece, for example a bodywork part, and to comply therewith.

It is understood that the abovementioned exemplary embodiments apply equivalently to the herein presented method for acquiring the position and orientation of the end effector of the robot.

It is also understood that the abovementioned features and the features still to be explained below apply not only on their own but rather also in any desired combination with one another, without departing from the spirit and scope of this disclosure.

BRIEF DESCRIPTION OF THE DRAWINGS

The disclosure will now be described with reference to the drawings wherein.

DESCRIPTION OF EXEMPLARY EMBODIMENTS

Figure 1:
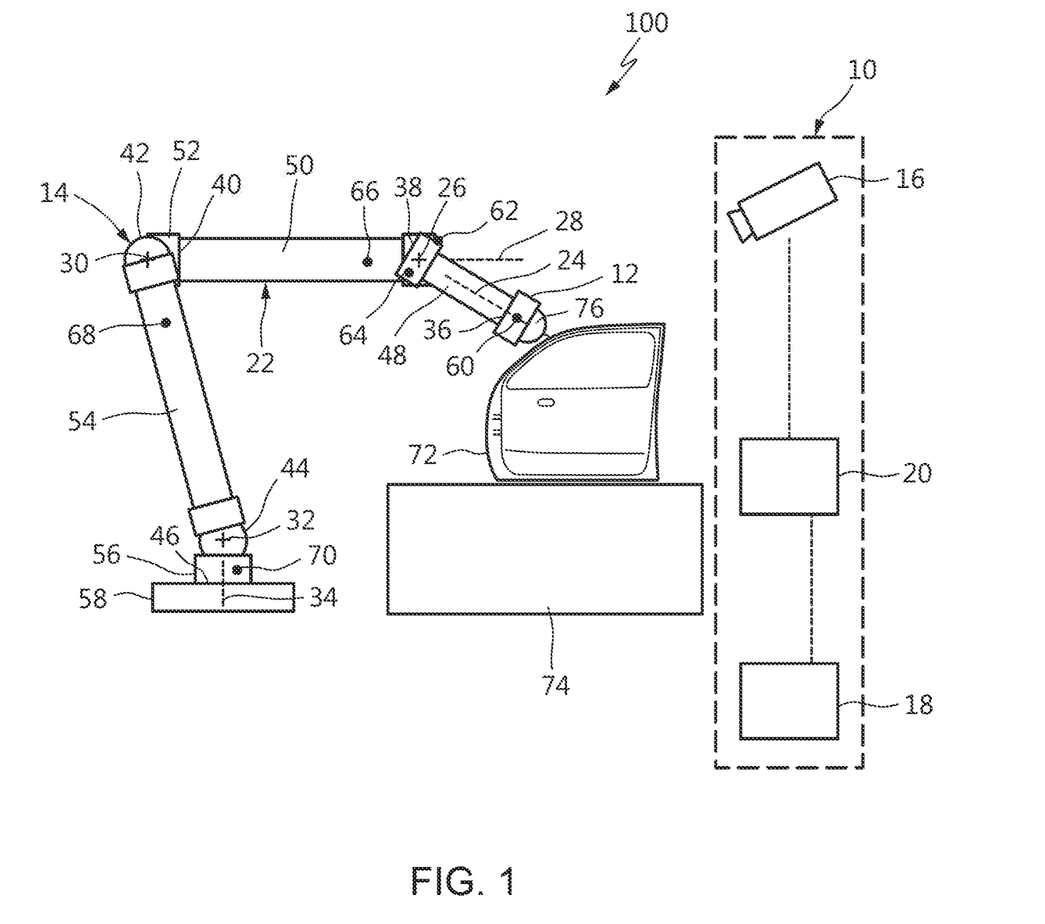
FIG. 1 shows a device and a position acquisition system according to a first exemplary embodiment of the disclosure in a first case.

FIG. 1 shows a device 10 for acquiring a position and orientation of an end effector 12 of a robot 14 according to a first exemplary embodiment of the disclosure. The device 10 includes an optical sensor 16. The optical sensor 16 may be for example a camera 17 or another sensor system for recording image data. In other exemplary embodiments, the optical sensor 16 may also have a plurality of optical sensors 16 that may be arranged for example in a common housing or spaced apart from one another in a space.

The device 10 includes a storage device 18 and an evaluation device 20 in addition to the optical sensor 16.

The storage device 18 may be configured for example as a hardware memory, for example a hard disk memory. In other exemplary embodiments, the storage device 18 may also be configured as a virtual memory, for example as a cloud memory. The storage device 18 may be arranged separately from the evaluation device 20, integrated at least partly therein, or arranged thereon.

The evaluation device 20 may be formed for example by one or more computer devices, for example microcontrollers, systems on a chip (SoC)s and/or computers. In other exemplary embodiments, purely Internet-based and/or Ethernet-based systems are conceivable in which the evaluation takes place on large computers or in (typically autonomous) computing centers.

The device 10 for acquiring the position and orientation of the end effector 12 of the robot 14 forms, together with the robot 14, a position acquisition system 100.

The robot 14 of the position acquisition system 100 includes a robot arm 22. The robot arm 22 has a plurality of axes 24, 26, 28, 30, 32, and 34. The plurality of axes 24 to 34 are coupled to one another by a plurality of joints 36, 38, 40, 42, 44, and 46. It is pointed out that the robot 14 illustrated in the figures having the robot arm 22 is just one of many different possible exemplary embodiments of robots which can be implemented. Without departing from the scope of this disclosure, the robot 14 may also be configured for example with more or fewer than six axes.

Starting from a first end of the robot arm 22 on which the end effector 12 is arranged, a first element 48 of the robot arm 22 is connected to the end effector 12 by a first joint 36. The first joint 36 defines a rotational movement about a first axis 24 of the plurality of axes 24 to 34. The first element 48 of the robot arm 22 is connected to a second element 50 of the robot arm 22 by a second joint 38 of the plurality of joints 36 to 46. The second joint 38 defines a rotational movement about a second axis 26. The second element 50 of the robot arm 22 is connected to a third element 52 of the robot arm 22 by a third joint 40. The third joint 40 defines a rotational movement about a third axis 28 of the plurality of axes 24 to 34. The third element 52 of the robot arm 22 is connected to a fourth element 54 of the robot arm 22 by a fourth joint 42. The fourth joint 42 defines a rotational movement about a fourth axis 30. The fourth element 54 of the robot arm is connected to a fifth element 56 of the robot arm 22 by a fifth joint 44. The fifth joint 44 defines a rotational movement about a fifth axis 32. The fifth element 56 of the robot arm 22 is connected to an installation base 58 by a sixth joint 46. The sixth joint 46 defines a rotational movement about a sixth axis 34.

The installation base 58 in the exemplary embodiment shown in FIG. 1 is provided merely by way of example for the robot 14. In other exemplary embodiments, the robot 14 or the robot arm 22 may also be arranged differently.

The robot 14 or the robot arm 22 thus includes six joints 36 to 46 and six axes 24 to 34. In other exemplary embodiments, the robot 14 may also have more or fewer than six axes 24 to 34 or joints 36 to 46. A configuration in which the robot 14 has six degrees of freedom, that is to say six axes 24 to 34, should thus be understood merely as an exemplary embodiment. The joints 36 to 46 may be for example ball joints, ellipsoid joints, saddle joints, hinge joints, pivot joints, and/or other joints, which may have one or a plurality of degrees of freedom depending on the joint type. It is thus not absolutely necessary for the number of joints 36 to 46 to match the number of axes 24 to 34, that is to say degrees of freedom.

A first optical marker 60 is arranged on the first axis 24 of the plurality of axes 24 to 34. The first optical marker 60 is illustrated by way of example in the form of a black circle. The first optical marker 60 is arranged on the end effector 12 in the present exemplary embodiment. In other exemplary embodiments, the first optical marker 60 may also be arranged for example on the first element 48 of the robot arm 22, that is to say following the first joint 36. A second optical marker 62 is arranged on the second axis 26. A third optical marker 64 is arranged close to the second joint 38 on the third axis 28. A fourth optical marker 66 is arranged at a large distance from the fourth joint 42 on the fourth axis 30. A fifth optical marker 68 is arranged at a large distance from the fifth joint 44 on the fifth axis 32. A sixth optical marker 70 is arranged on the sixth axis 34. The arrangement of the fourth and fifth optical markers 66 and 68 at a large distance from the respective joints 42 and 44 is advantageous since, when acquiring a position by way of the positioning of the optical markers 66 and 68 at an upper end of the respective lever arm (of the fourth and fifth element 54 and 56 of the robot arm 22), starting from the respective joint 42 and 44, there are smaller errors in comparison with positioning in the vicinity of the joints 42 and 44.

A lower number of joints 36 to 46 is arranged between the end effector 12 and the first axis 24 than between the end effector 12 and the second axis 26. In the present case, the first joint 36 is arranged between the end effector 12 and the first axis 24. The first joint 36 and the second joint 38 are on the other hand arranged between the end effector 12 and the second axis 26.

The optical sensor 16 is configured to acquire image data of the first and/or second optical markers 60 and 62. In the present exemplary embodiment, the optical sensor is furthermore configured to acquire image data of the first to sixth optical markers 60 to 70. The image data acquired by the optical sensor 16 are transmitted for example to the evaluation device 20 via one or more cables or wirelessly. The evaluation device 20 of the device 10, in the first exemplary embodiment shown in FIG. 1 in which the first optical marker 60 is visible to the optical sensor 16, is configured to determine a first position of the first optical marker 60 based on the image data. The evaluation device 20 is configured to determine the position and orientation of the end effector 12 based on the first position. In the exemplary embodiment shown in FIG. 1, the first position of the first optical marker corresponds to the position and orientation of the end effector 12, since the first optical marker 60 is arranged directly on the end effector 12.

In the first exemplary embodiment shown in FIG. 1, the robot arm 22 is located in a working position, since it is not concealed by a bodywork part 72. The first optical marker 60 is thus visible to the optical sensor 16. The bodywork part 72 is arranged on a production table 74, illustrated by way of example, in FIG. 1. In other exemplary embodiments not shown here, the bodywork part 72 may also be arranged for example on a conveyor line and travel past the working position of the robot 14. While the bodywork part 72 is travelling past, the robot 14 may for example perform a working process, for example measuring weld spots on the bodywork part. The working position of the robot 14 in FIG. 1 corresponds for example to a working position before the beginning of a working procedure.

An optical measurement sensor 76 that is advantageously present is additionally arranged on the end effector 12 in FIG. 1. The optical measurement sensor 76 may be configured for example to perform measurements on a workpiece, in the present case here on the bodywork part 72. In other exemplary embodiments, a tactile measurement sensor may be arranged on the end effector 12, which tactile measurement sensor acquires for example a surface contour of a workpiece, or of the bodywork part 72, by way of a sampling movement. In other exemplary embodiments not shown here, one or more optical and/or tactile measurement sensors may also be arranged together with one or more tools on the end effector 12 of the robot arm 22 of the robot 14.

Figure 2:
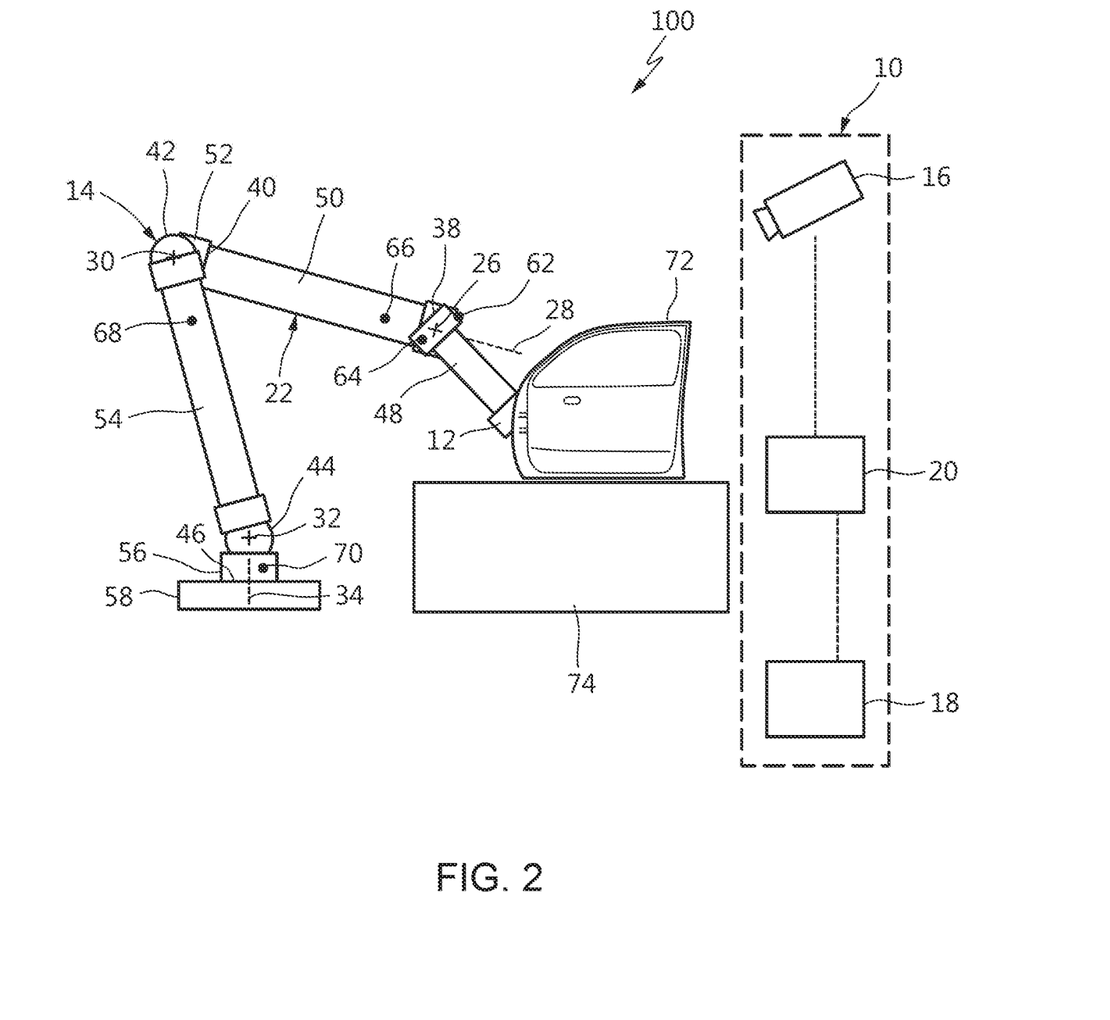
FIG. 2 shows the device and the position acquisition system according to the first exemplary embodiment of the disclosure in a second case.

FIG. 2 shows the first exemplary embodiment. In the second exemplary, the first optical marker 60 is not visible to the optical sensor 16. The optical sensor 16 may however acquire the second optical marker 62, that is to say in other words that the second optical marker 62 is visible to the optical sensor 16. The robot 14 or the robot arm 22 in FIG. 2 is located in an operating position different from FIG. 1. The end effector 12 is at least partly concealed by the bodywork part 72, such that the first optical marker 60 is not visible to the optical sensor 16.

The evaluation device 20 in the second exemplary embodiment is configured to determine a second position of the second optical marker 64 based on the image data generated or acquired by the optical sensor 16 and to determine the position and orientation of the end effector 12 based on the second position and based on a kinematic model, stored in the storage device 18, of the robot 14.

In a third exemplary embodiment, not shown, the first and the second axes 24 and 26 or the first and the second optical markers 60 and 62 may also be concealed for example by the bodywork part 72, such that both the first and the second optical markers 60 and 62 are not visible to the optical sensor 16, but the third optical marker 64 is visible to the optical sensor 16. In the third exemplary embodiment, the evaluation device 20 is configured to determine a third position of the third optical marker 64 based on the image data and to determine the position and orientation of the end effector 12 based on the third position and based on the kinematic model.

In other words, the position of the robot arm 22 is determined, in the third exemplary embodiment, as far as the third position of the third optical marker 64 based on the acquired image data, and the position and orientation of the end effector 12 is determined based on the kinematic model starting from the third position. The kinematic model in this exemplary embodiment determines for example, starting from the third position of the third optical marker 64, a setpoint position or a setpoint angle of rotation of the second joint 38 and a setpoint position or a setpoint angle of rotation of the first joint 36. Using the optically acquired third position of the third optical marker 64 and the setpoint angle of rotation, calculated by the kinematic model, of the first and second joint 36 and 38, it is possible to determine the position and orientation of the end effector 12.

Figure 3:
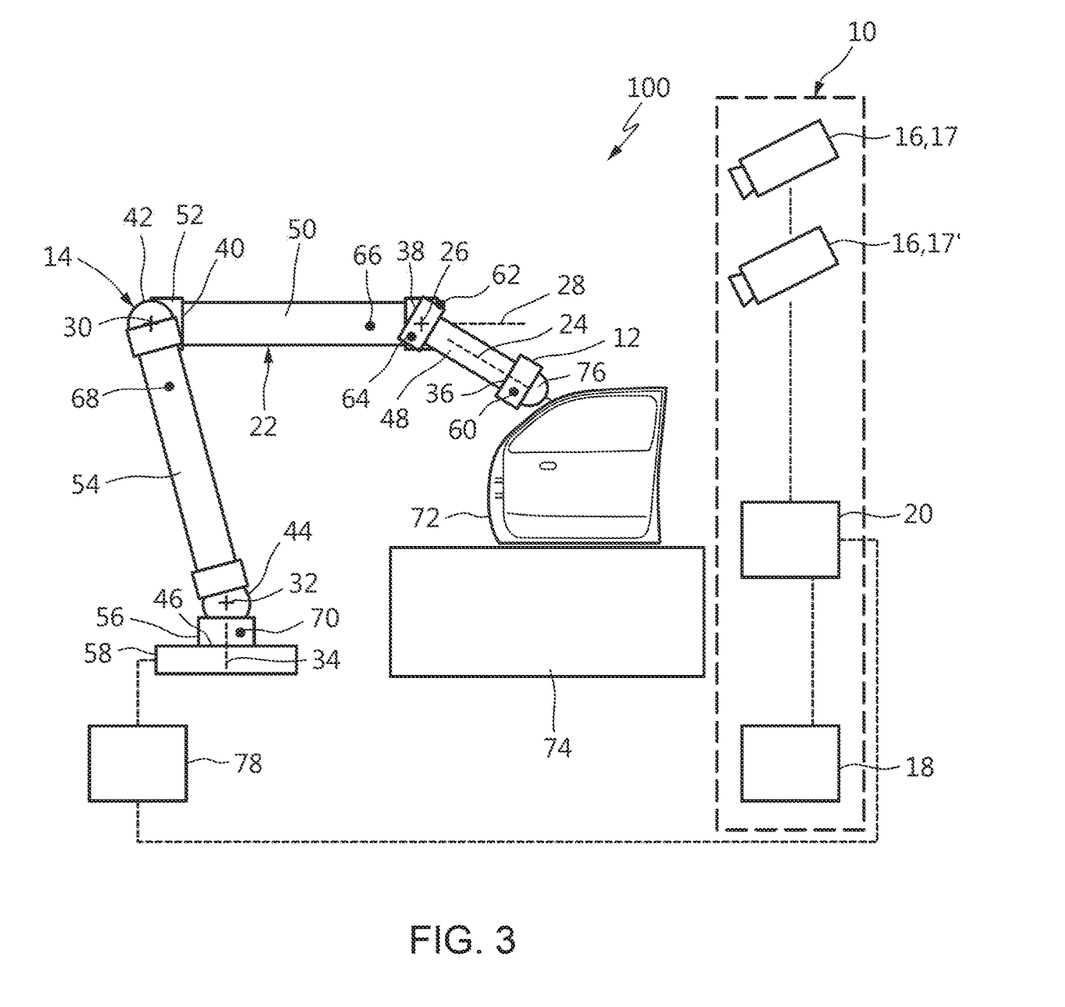
FIG. 3 shows a device and a position acquisition system according to a second exemplary embodiment of the disclosure in a first case.

FIG. 3 shows the second exemplary embodiment of the device 10 and of the position acquisition system 100. The optical sensor 16 of the device 10 includes a plurality of cameras 17 to 17' in the second exemplary embodiment. FIG. 2 depicts two cameras 17 and 17', which are representative of the plurality of cameras 17 to 17'. The two cameras 17 and 17' are arranged at different positions (above one another in the present case) and thereby have two different fields of view. In exemplary embodiments not shown here, the plurality of cameras 17 to 17' may also be arranged for example in a single housing or distributed at different positions in a space.

The position acquisition system 100 according to the second exemplary embodiment includes a control device 78 that is configured to control the robot 14 based on control commands. The control device 78 is connected to the robot 14 and/or the evaluation device 20 by one or more cables or wirelessly. In the exemplary embodiment shown in FIG. 3, the control device 78 is connected both to the robot 14 and to the evaluation device 20 by a plurality of cables.

The evaluation device is further configured to receive the control commands from the control device 78 in order to control the robot arm 22. The position and orientation of the end effector 12 are acquired in the same way as in the exemplary embodiment shown in FIG. 1 based on evaluating the image data of the first optical marker 60, that is to say determining the first position of the first optical marker 60. In the exemplary embodiment shown in FIG. 3, the image data are acquired by the two cameras 17 and 17', typically in partly redundant form due to overlapping fields of view.

In the second exemplary embodiment shown in FIG. 3, the evaluation device 20 is furthermore configured so as, in addition to the first position, to determine a fourth position of the first optical marker 60 based on the kinematic model. The evaluation device is in this case configured to calibrate the kinematic model based on a comparison of the first position with the fourth position. The comparison of the first position with the fourth position may in this case be carried out by way of a comparison of the two actual positions, acquired by the two cameras 17 and 17', with a position determined (calculated) using the kinematic model. The comparison leads to a correction of the kinematic model since, when calculating the fourth position, for example due to a temperature expansion of parts (for example the elements 48 to 56) of the robot arm 22, the calculated position may deviate from the actual position. The deviation may be corrected by comparing the first position with the fourth position.

Figure 4:
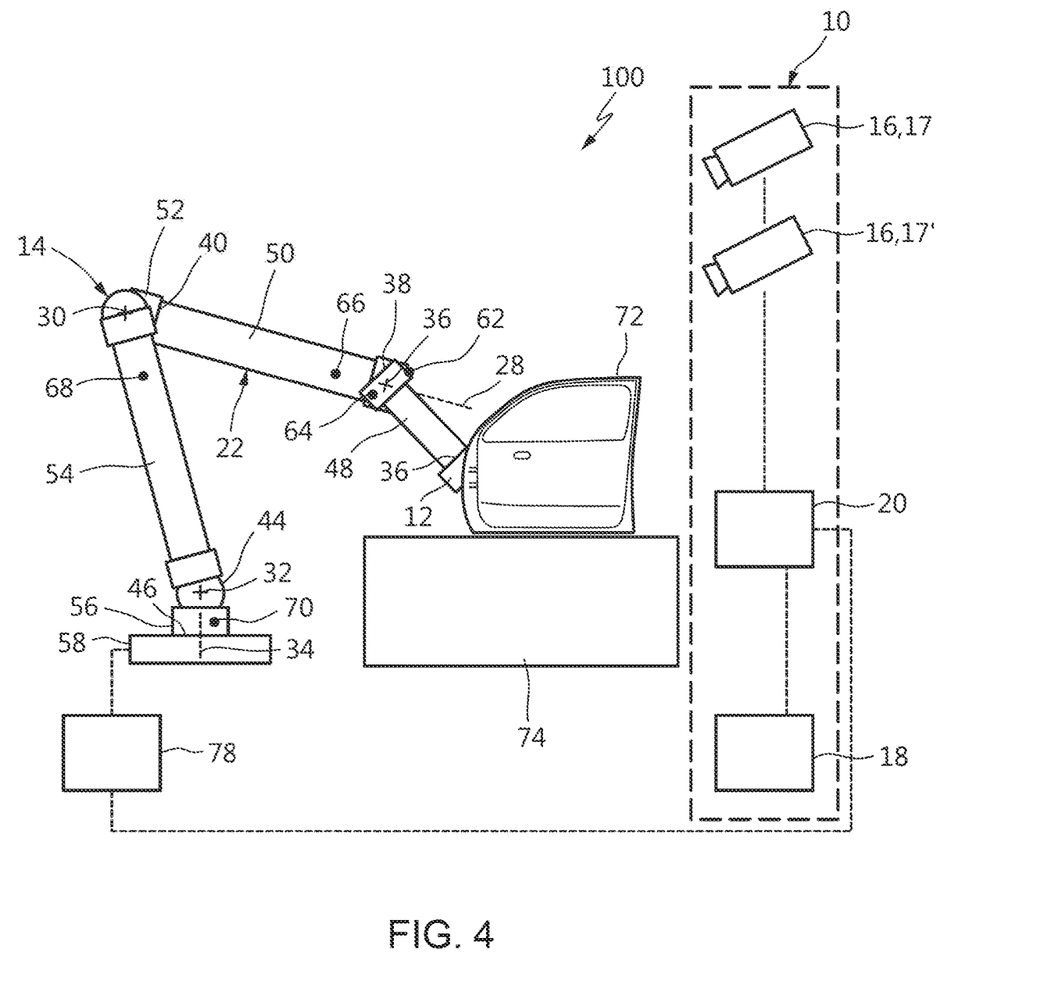
FIG. 4 shows the device and the position acquisition system according to the second exemplary embodiment of the disclosure in a second case.

FIG. 4 shows the second exemplary embodiment of the device 10 or of the position acquisition system 100 in the second case. The position and orientation of the end effector 12 are determined in the same way as in the exemplary embodiment shown in FIG. 2.

The evaluation device 20 is configured so as, in addition to the second position of the second optical marker 62 that is determined by evaluating the image data, to determine a fifth position of the second optical marker 62 based on the kinematic model. The kinematic model may be calibrated based on a comparison of the second position with the fifth position.

Figure 5:
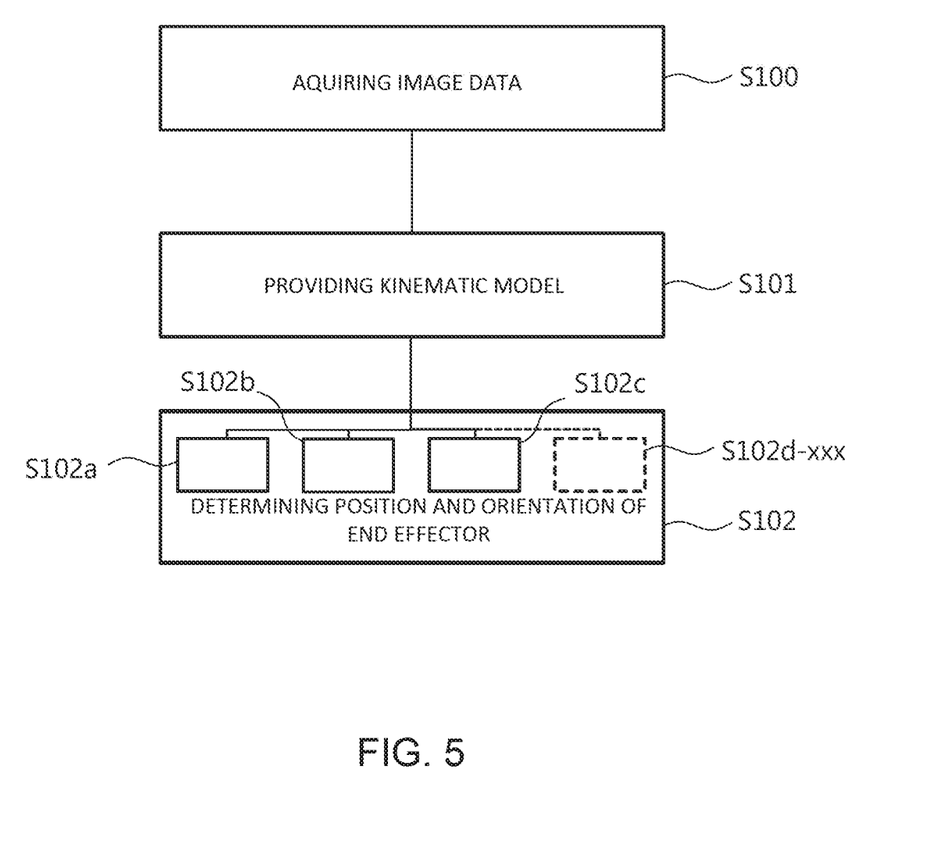
FIG. 5 shows s flowchart of a method for acquiring a position and orientation of an end effector of a robot according to an exemplary embodiment of the disclosure.

FIG. 5 shows flowchart of a method for acquiring a position and orientation of the end effector 12 of the robot 14 according to an exemplary embodiment, which includes the following steps. In a step S100, image data of the first and/or second optical marker 60 and 62 are acquired. In a step S101, a kinematic model of the robot arm 22 is provided. In a step S102, the position and orientation of the end effector 12 are determined depending on which of the optical markers (for example 60 to 70) can be acquired.

By way of example, in a step S102a, the position and orientation of the end effector 12 are determined, in the first case in which the optical marker 60 is able to be acquired, based on the determined first position of the first optical marker 60. On the other hand, in a step S102b, which can be executed as an alternative to step S102a, the position and orientation of the end effector 12 are determined in the second case, in which the first optical marker 60 cannot be acquired but the second optical marker 62 can be acquired, based on the second position of the second optical marker 62 and based on the kinematic model.

A step S102c constitutes a further alternative to steps S102a and S102b. In step S102c, the first and second optical marker 60, 62 can for example not to be acquired, but a third optical marker 64 can be acquired. The position and orientation of the end effector 12 are determined based on the third position of the third optical marker 64 (by evaluating the image data) and based on the kinematic model.

FIG. 5 additionally illustrates another plurality of notional steps S102d to S102xxx, in which the position and orientation of the end effector 12 are determined depending on the ability of the optical markers arranged on the robot arm 22 to be acquired. The evaluation device 20 in this case searches for the respective optical marker from a plurality of optical markers 60 to 70 that has the lowest number of joints 36 to 46 between the end effector 12 and the respective axes 24 to 34 and is additionally visible to the optical sensor 16.

It is understood that the foregoing description is that of the exemplary embodiments of the disclosure and that various changes and modifications may be made thereto without departing from the spirit and scope of the disclosure as defined in the appended claims.

What is claimed is:

1. A device for acquiring a position and an orientation of an end effector of a robot, the robot having a robot arm including a plurality of axes coupled to one another by a plurality of joints, the end effector being arranged on a first end of the robot arm, a first optical marker being arranged on a first axis of the plurality of axes, a second optical marker being arranged on a second axis of the plurality of axes, and a first number of the plurality of being arranged between the end effector and the first axis and a second number of the plurality of joints being arranged between the end effector and the second axis, the first number being lower than the second number, the device comprising:
an optical sensor configured to acquire image data of the first optical marker and/or of the second optical marker;
a storage device storing a kinematic model of the robot arm; and
an evaluation device configured to determine based on the image data whether the first optical marker and the second optical marker are visible to the optical sensor, and, if it is determined based on the image data that the first optical marker is visible to the optical sensor or that the first optical marker and the second optical marker are visible to the optical sensor, to determine a first position of the first optical marker based on the image data and to determine the position and the orientation of the end effector based on the first position, and, if it is determined based on the image data that the first optical marker is not visible to the optical sensor but the second optical marker is visible to the optical sensor, to determine a second position of the second optical marker based on the image data, to determine a relative position and a relative orientation of the end effector relative to the second position based on the kinematic model, and to determine the position and the orientation of the end effector based on the determined second position and the determined relative position and relative orientation of the end effector relative to the second position.

2. The device according to claim 1, wherein:
the optical sensor is configured to acquire the image data of a third optical marker arranged on a third axis of the plurality of axes,
a third number of the plurality of joints is arranged between the end effector and the third axis,
the second number is lower than the third number,
the evaluation device is configured, in a third case in which both the first and the second optical marker are not visible to the optical sensor but the third optical marker is visible to the optical sensor, to determine a third position of the third optical marker based on the image data and to determine the position and the orientation of the end effector based on the third position and based on the kinematic model.

3. The device according to claim 1, wherein the evaluation device is configured to determine a fourth position of the first optical marker based on the kinematic model, and to calibrate the kinematic model based on a comparison of the first position with the fourth position.

4. The device according to claim 1, wherein the evaluation device is configured to determine a fifth position of the second optical marker based on the kinematic model, and to calibrate the kinematic model based on a comparison of the second position with the fifth position.

5. The device according to claim 1, wherein the optical sensor includes a plurality of cameras.

6. The device according to claim 1, wherein the evaluation device is further configured to receive control commands from a control device in order to control the robot arm and, in the second case, to determine the position and the orientation of the end effector based on the second position, based on the kinematic model and based on the control commands.

7. A position acquisition system comprising:
a robot including an end effector, a first optical marker, a second optical marker, and a robot arm, the robot arm including a plurality of axes coupled to one another by a plurality of joints, the end effector being arranged on a first end of the robot arm, the first optical marker being arranged on a first axis of the plurality of axes, the second optical marker being arranged on a second axis of the plurality of axes, a first number of the plurality of joints being arranged between the end effector and the first axis, a second number of the plurality of joints being arranged between the end effector and the second axis, and the first number being lower than the second number;
a device configured to acquire a position and an orientation of the end effector of the robot, the device including:
an optical sensor configured to acquire image data of the first optical marker and/or of the second optical marker;
a storage device storing a kinematic model of the robot arm; and
an evaluation device configured to determine based on the image data whether the first optical marker and the second optical marker are visible to the optical sensor, and, if it is determined based on the image data that the first optical marker is visible to the optical sensor or that the first optical marker and the second optical marker are visible to the optical sensor, to determine a first position of the first optical marker based on the image data and to determine the position and the orientation of the end effector based on the first position, and, if it is determined based on the image data that the first optical marker is not visible to the optical sensor but the second optical marker is visible to the optical sensor, to determine a second position of the second optical marker based on the image data, to determine a relative position and a relative orientation of the end effector relative to the second position based on the kinematic model, and to determine the position and the orientation of the end effector based on the determined second position and the determined relative position and relative orientation of the end effector relative to the second position.

8. The position acquisition system according to claim 7, wherein the robot arm has six axes.

9. The position acquisition system according to claim 7, wherein none of the plurality of joints is arranged between the end effector and the first axis.

10. The position acquisition system according to claim 9, wherein at least one of the plurality of joints is arranged between the end effector and the second axis.

11. The position acquisition system according to claim 7, wherein the first optical marker is arranged on the end effector.

12. The position acquisition system according to claim 7, wherein the robot further includes a tactile and/or an optical measurement sensor arranged on the end effector.

13. A method for acquiring a position and an orientation of an end effector of a robot, the robot having a robot arm including a plurality of axes coupled to one another by a plurality of joints, the end effector being arranged on a first end of the robot arm, a first optical marker being arranged on a first axis of the plurality of axes, a second optical marker being arranged on a second axis of the plurality of axes, a first number of plurality of joints being arranged between the end effector and the first axis, a second number of the plurality of joints being arranged between the end effector and the second axis, the first number being lower than the second number, the method comprising:
acquiring image data of the first optical marker and/or of the second optical marker;
providing a kinematic model of the robot arm;
determining based on the image data whether the first optical marker and the second optical marker are detectable in the image data; and
determining the position and the orientation of the end effector, wherein, if it is determined based on the image data that the first optical marker is detectable in the image data or that the first optical marker and the second optical marker are detectable in the image data, determining a first position of the first optical marker based on image data and determining the position and the orientation of the end effector based on the first position, and, if it is determined based on the image data that the first optical marker is not detectable in the image data but the second optical marker is detectable in the image data, determining a second position of the second optical marker based on the image data, determining a relative position and a relative orientation of the end effector relative to the second position based on the kinematic model, and determining the position and the orientation of the end effector based on the determined second position and the determined relative position and relative orientation of the end effector relative to the second position.

14. The method according to claim 13, further comprising:
acquiring image data of a third optical marker arranged on a third axis of the plurality of axes, wherein a third number of the plurality of joints is arranged between the end effector and the third axis, and wherein the second number is lower than the third number; and
determining, in a third case in which both the first and the second optical marker are not visible to an optical sensor but the third optical marker is visible to the optical sensor, a third position of the third optical marker based on the image data and determining the position and the orientation of the end effector based on the third position and based on the kinematic model.

15. The method according to claim 13, further comprising:
determining a fourth position of the first optical marker based on the kinematic model; and
calibrating the kinematic model based on a comparison of the first position with the fourth position.

16. The method according to claim 13, further comprising:
determining a fifth position of the second optical marker based on the kinematic model; and
calibrating the kinematic model based on a comparison of the second position with the fifth position.

17. The method according to claim 13, further comprising:
   receiving control commands for controlling the robot arm; and
   determining, in the second case, the position and the orientation of the end effector based on the second position, based on the kinematic model, and based on control commands.

* * * * *